United States Patent [19]
Yoshizawa

[11] 3,776,337
[45] Dec. 4, 1973

[54] DRY-DISC FRICTION CLUTCH
[75] Inventor: Katuyuki Yoshizawa, Tokyo, Japan
[73] Assignee: Nissan Motor Company, Limited, Kanagawa-ku, Yokohama City, Japan
[22] Filed: Dec. 27, 1971
[21] Appl. No.: 212,185

[30] Foreign Application Priority Data
June 22, 1971 Japan.............................. 46/53758

[52] U.S. Cl........ 192/110 B, 192/70.19, 192/70.28, 192/110 R, 308/189 A
[51] Int. Cl...................... F16d 13/44, F16d 13/58
[58] Field of Search...................... 192/70.19, 70.2, 192/70.27, 70.28, 70.29, 70.3, 110 R, 110 B; 308/189 A

[56] References Cited
UNITED STATES PATENTS

| | | | |
|---|---|---|---|
| 1,362,910 | 12/1920 | Zoeller et al. | 308/189 A |
| 1,538,034 | 5/1925 | Frey | 192/110 R X |
| 1,705,281 | 3/1929 | Bott | 308/189 A |
| 1,800,564 | 4/1931 | O'Connor | 308/189 A |
| 1,893,413 | 1/1933 | Hirsh et al. | 192/110 R X |
| 2,131,579 | 9/1938 | Bear | 192/70.29 |
| 2,618,368 | 11/1952 | Hoover | 192/110 B X |
| 3,276,556 | 10/1966 | Witt | 192/110 B |
| 3,624,771 | 11/1971 | McNamara | 192/110 B |

Primary Examiner—Allan D. Herrmann
Attorney—Robert E. Burns et al.

[57] ABSTRACT

In order to prevent retarded or incomplete disengagement of the clutch disc from the engine flywheel due to deteriorated sliding engagement between the transmission input shaft and the clutch hub splined thereto and due to the axial thrust imparted to the transmission input shaft as a result of the rotation of the left-hand helical main drive gear on the input shaft, the clutch is provided with pressure means which is adapted to urge the transmission input shaft away from the engine crankshaft thereby to overcome or cancel such axial thrust on the transmission input shaft.

10 Claims, 11 Drawing Figures

DRY-DISC FRICTION CLUTCH

This invention relates to friction clutches and, more particularly, to friction clutches of the dry-disc type for use with manually operated power transmission systems of motor vehicles.

The dry-disc friction clutches generally use one or more clutch discs which are interposed between a flywheel connected to an engine crankshaft and a pressure plate which is positioned relative to the flywheel. The clutch disc, which is provided with friction facings on both sides thereof, is secured to a clutch hub splined to an input shaft of the power transmission system so that the clutch disc is movable axially of the transmission input shaft. The pressure plate is loaded with a clutch spring having a neutral position in which the pressure plate is biased to force the clutch discs into engagement with the flywheel when the clutch is maintained in a coupled condition whereby a drive torque is transmitted from the engine crankshaft to the transmission input shaft. The clutch spring is associated with a clutch release mechanism which has a clutch release bearing and a withdrawal lever which is operatively connected to a clutch pedal. When, thus, the clutch pedal is depressed to bring the clutch into an uncoupled condition, this movement is transmitted to the withdrawal lever which, in turn, moves the clutch release bearing against the action of the clutch spring, thereby relieving the pressure plate of the spring pressure and accordingly disengaging the clutch discs from the engine flywheel. It is, in this instance, important that the clutch disc or discs be completely and immediately retracted from the flywheel when the pressure plate is relieved of the spring pressure so that no drive torque is delivered to the transmission input shaft.

Such complete and immediate disengagement of the clutch disc of discs is, however, sometimes impracticable due to deteriorated sliding engagement between the transmission input shaft and the clutch hub supporting the clutch disc or discs thereon. The result is that delivery of the drive torque from the engine crankshaft to the transmission input shaft is continued or incompletely interrupted even after the spring action on the pressure plate has been removed with the clutch pedal being depressed.

The transmission input shaft has formed at its rear end portion a main drive gear which is held in constant mesh with a counter drive gear formed on a counter drive shaft of the transmission system. The main drive gear is usually a left-hand helical gear while the counter drive gear is a right-hand helical gear. When, therefore, the transmission system is shifted from idling to start condition, an axial thrust is imparted to the transmission input shaft by reason of a tendency for continuous action along the helices of mating teeth of the two helical gears. This axial thrust causes the transmission input shaft to be urged or moved toward the engine crankshaft. If, in this condition, the transmission input shaft fails to freely slide on the clutch hub to which the same is splined, as caused by an increased friction resistance therebetween due to abrasion thereof, then the clutch disc on the splined clutch hub tends to move toward the flywheel. Rotation of the flywheel is thus objectionably transmitted to the clutch disc and accordingly to the transmission input shaft through th pressure plate as it is moved to its retracted position.

This problem will be solved if the helical main and counter drive gears of the transmission system are replaced with usual spur gears so that no axial thrust is produced when such gears are rotated together. The use of the spur gears, however, results in other important problems such as a shortened gear lift and generation of noises and, as such, have been practically not acceptable. A solution may also be provided to the above-noted problems if the direction of the helix angles of the main and counter drive gears are inversed, viz., if the main drive gear is a right-hand helical gear and the counter gear is a left-hand helical gear. The axial thrust resulting from the rotation of such helical gears will now be imparted to the transmission input shaft in a reversed direction, viz., toward the main drive shaft of the transmission system. A difficulty is thus encountered in how such axial thrust should be borne completely within the structure of the transmission system without extension and drastic changes and modifications made thereto.

The amount of movement of the transmission input shaft toward the engine crankshaft is usually dictated by an allowance for movement in an axial direction of a main drive bearing through which the transmission input shaft is supported by a clutch housing, as is well known in the art. The smaller such allowance, the smaller will the amount of movement of the transmission input shaft be. Since, moreover, the pressure with which the clutch disc or discs bear against the flywheel is mathematically a product of the spring constant of the clutch disc or discs and the amount of displacement of the transmission input shaft, such pressure also becomes smaller as the allowance for movement of the main drive bearing. This will mean that the disengagement of clutch disc or discs can be accomplished smoothly if the main drive bearing of the transmission system is afforded with a limited allowance for movement in the axial direction. The fact is, however, that various difficulties are practically involved in limiting such allowance of the main drive bearing.

It is, therefore, an important object of this invention to provide an improved dry-disc friction clutch for use with manually operated motor vehicle power transmission system. The clutch is specifically of the character which is adapted to accomplish smooth and immediate disengagement of the clutch disc or discs from the engine flywheel when the clutch pedal is depressed and the pressure plate relieved of the spring pressure so as to have the transmission system shifted from idling to forward drive condition.

It is another important object of the invention to provide an improved dry-disc friction clutch for particular use with motor vehicle power transmissions using usual helical gears as its main drive and counter drive gears, the clutch being completely and immediately uncoupled even though the sliding engagement between the transmission input shaft and the clutch hub splined thereto is deteriorated.

It is still another important object of the invention to provide an improved dry-disc friction clutch in which the clutch disc or discs are released from the engine flywheel completely and immediately as soon as the pressure plate is freed from the spring pressure, such clutch being compatible with manually operated motor vehicle power transmission systems with a usually arranged main drive bearing.

In order to accomplish these objects, the friction clutch herein proposed has pressure means constantly exerting a pressure upon the transmission input shaft so that the transmission input is biased away from the engine crankshaft against the axial thrust imparted to the input shaft as a result of the rotation of the main and counter drive gears of the transmission system. Such pressure means may comprise a compression spring which is accommodated within an axial bore in the engine crankshaft into which a pilot end portion of the transmission input shaft extends or a fluid under pressure which is entrapped in or drawn into the axial bore so as to exert a fluid pressure on the transmission input shaft at its pilot end. Or otherwise, the pressure means may comprise a thrust ball bearing fitting on a stepped or reduced portion of the transmission input shaft adjacent its pilot end portion and interposed between the crankshaft and the clutch hub, at least one thrust washer fitting on the pilot end portion of the transmission input shaft and positioned between the crankshaft and the thrust ball bearing, coned disc springs which are positioned in vis-a-vis relationship to each other at both ends of the thrust washer for axially pressing the thrust ball bearing against the transmission input shaft away from the crankshaft, insert elements on which the coned disc springs are seated and by which the coned disc springs are from each other, and retaining means for axially movably holding the thrust ball bearing in position relative to the transmission input shaft. In this instance, the coned disc springs may be substituted for any other resilient element or elements such as a rubber ring, a coned helical spring or a coil spring or any combination of these.

Other features and advantages of the friction clutch according to this invention will become more apparent from the following description taken in conjunction with the accompanying drawings in which like reference numerals aned characters designate corresponding parts throughout the figures and in which.

Figure 1:
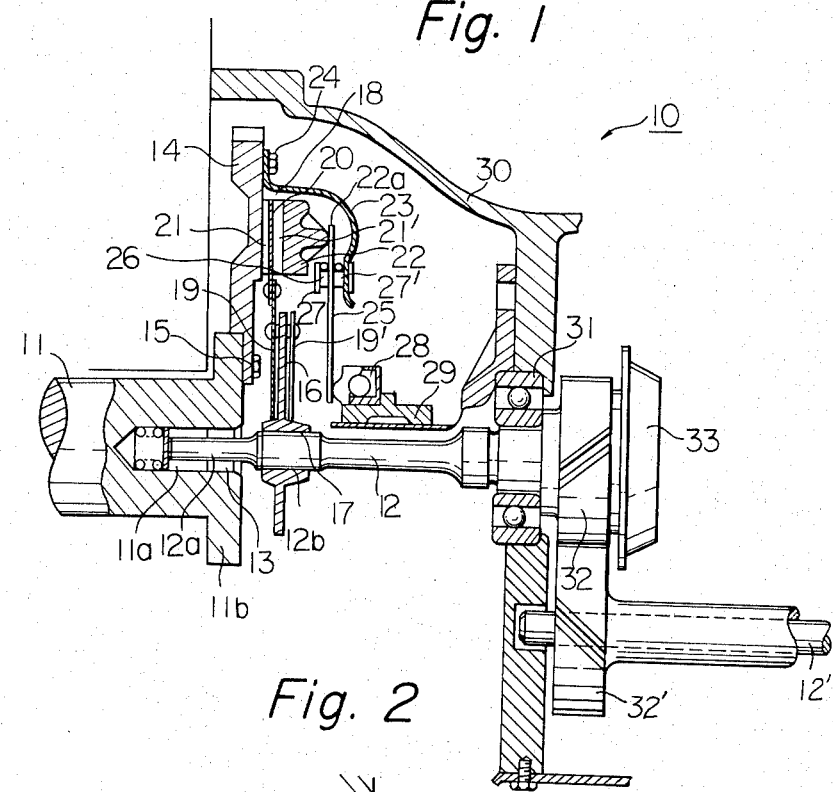
FIG. 1 is a longitudinal sectional view of a preferred embodiment of the friction clutch according to the invention and some elements associated therewith.

Referring now to the drawings, first to FIG. 1, the friction clutch according to this invention as generally designated by reference numeral 10 forms part of a motor vehicle power transmission system of the counter-shaft type. The transmission system includes, as customary, a crankshaft 11 which is driven from a motor vehicle engine such as an internal combustion engine, not shown. The crankshaft 11 has formed at its leading end portion an axial bore 11a and a flange 11b. A transmission input shaft 12 is aligned with this engine crankshaft 11 and has a pilot end portion 12a extending partly into the bore 11a in the crankshaft. The pilot end portion 12a of the shaft 12 is rotatable relative to the crankshaft 11 through a pilot bearing or bushing 13. A flywheel 14 is connected to the flange 11b of the engine crankshaft 11 through a bolt 15 or any other suitable fastening means, the flywheel thus being rotatable with the crankshaft.

A clutch hub 16 having a radial extension 16a is splined as at the transmission input shaft 12 so as to be axially movable on the input shaft. The clutch hub 16 supports thereon a clutch disc 18 which consists essentially of clutch disc mounts 19 and 19' fast on both side of the radial extension 16a of the clutch hub, a cushioning plate 20 radially extending or secured to the clutch disc mount 19, and a pair of friction facings 21 and 21' which are rivetted, bonded or otherwise secured to both faces of the cushioning plate 20, as shown. A pressure plate 22 is disposed in close proximity to the clutch disc 18, the pressure plate being axially movable toward and away from the flywheel 14. The friction facings 21 and 21' of the clutch disc 18 are thus located in a manner to be engageable with the flywheel 14 and pressure plate 22 when the clutch as shown is in a coupled condition with the clutch disc tightly clamped therebetween as illustrated in FIG. 1.

A clutch cover 23 is secured at its edge to an outer peripheral portion of the flyweeh 14 through a bolt 24 or any other fastening means so that the clutch cover and flywheel are rotatable together. A coned disc spring 25 is secured halfway to a radial wall portion of the clutch cover 23 through a thrust rivet 26 which is shown as provided with thrust rings 27 and 27'. The clutch cover 23 thus serves not only to support the coned disc spring 25 but to contain thereon the clutch disc 18, pressure plate 22 and disc spring 25, as illustrated. The coned disc spring 25 has its outer peripheral edge seated on a back face, shown as partly protruded as at 22a, of the pressure plate 22 and its inner peripheral edge surrounding the transmission input shaft 12. The disc spring 24 urges, when held in its neutral position, the pressure plate 22 toward the flywheel 14 so that the clutch disc 18 is forced to bear against the flywheel. With the cone disc spring 25 thus maintained in the neutral position, rotation of the engine crankshaft 11 is transmitted to the transmission input shaft 12 through the flywheel 14 and clutch disc 18 or, in other words, the transmission input shaft 12 is driven in synchronism with the engine crankshaft 11.

The coned disc spring 25 is forced out of its neutral position by means of a clutch released mechanism which is operated by a clutch pedal to which it is connected. This clutch release mechanism usually includes a clutch release bearing 28 which is located to be engageable with the inner peripheral portion of the coned disc spring 25. The clutch release bearing 28 is supported on a sleeve 29 which is mounted on a clutch housing structure 30. This clutch release bearing 28 can be moved toward the crankshaft 10 by the movement of a withdrawl lever, not seen in FIG. 1, with which the release bearing is associated. When, thus, the clutch release bearing 28 is moved toward the crankshaft 11 and bears against the coned disc spring 25 with the clutch pedal depressed, then the coned disc spring 25 is compressed to release the pressure on the pressure plate 22 so that the clutch disc 18 is released from the flywheel 14 which is rotating with the crankshaft 10. Delivery of the drive torque from the engine crankshaft 10 to the transmission input shaft 12 is interrrupted in this manner.

The transmission input shaft 12 is supported on the clutch housing structure 30 through a main drive bearing 31 and has formed at its leading end a main drive gear 32 which, as previously noted, is a left-hand helical gear. The main drive gear 32 is held in constant mesh with a right-hand helical counter drive gear 32' which is formed on a counter drive shaft 12' of the transmission system. Indicated by reference numeral 33 is a dog gear.

Figure 2:
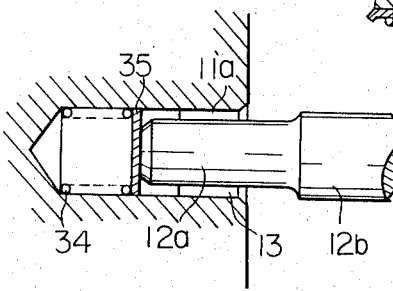
FIG. 2 is a fragmentary view illustrating, on an enlarged scale, essential parts of the device shown in FIG. 1.

A compression spring 34 is accommodated within the axial bore 11a in the engine crankshaft 11 and seated on a spring seat plate 35 which abuts against a leading end of the pilot end portion 12a of the transmission input shaft 12, as clearly seen in FIG. 2. The compression spring 34 thus serves to bias the tranmission input shaft 12 toward the transmision system or away from the crankshaft 11.

Figure 3:
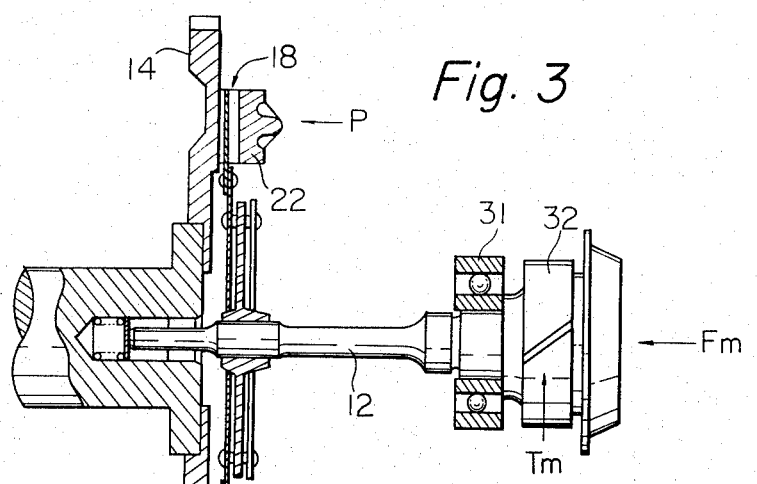
FIG. 3 is a schematic sectional view showing a principle of operation of a typical motor vehicle power transmission system of the dry-disc type.
Figure 4:
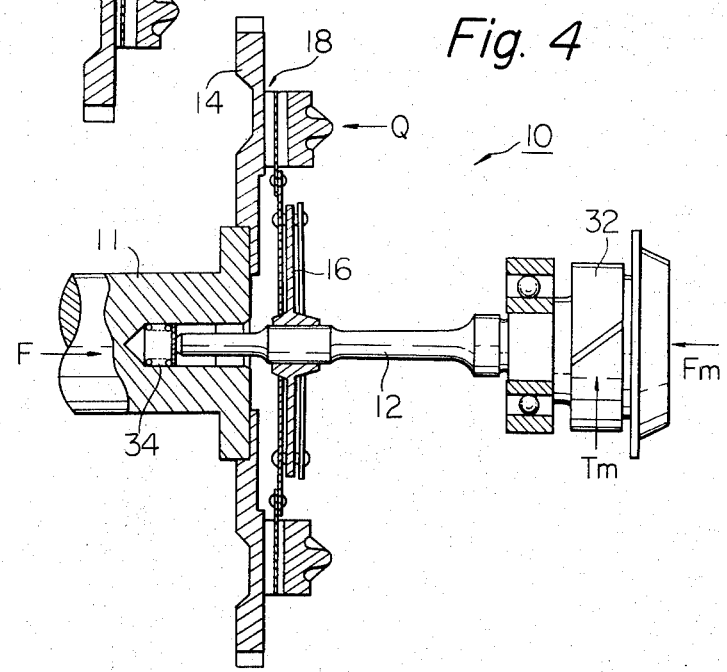
FIG. 4 is similar to FIG. 3 but now shows a principle of operation of the device shown in FIG. 1.

The advantages of the friction clutch 10 with the compression spring 34 thus incorporated therein will be appreciated from the following discussion with reference to FIGS. 3 and 4, in which arrows P and Q respectively represent pressures with which the clutch discs 18 bear against the flywheels 14 in a prior art friction clutch and the clutch according to this invention. Arrow F indicates a preset load on the compression spring 34 of the friction clutch 10 of the invention. Arrow $T_m$ stands for a synchronizing torque on the main drive gear 32 and arrow $F_m$ refers to an axial thrust imparted to the transmission shaft 12 as a result of the helix angle of the main drive gear 32.

When, now, the clutch pedal is depressed during idling so as to establish the first driving condition in the transmission system, then a synchronizing torque $T_m$ is produced in the main drive gear 32 and an axial thrust $F_m$ is imparted to the transmission input shaft 12 due to the tendency for continuous action along the helices of the mating teeth of the main drive gear 32 and the counter gear 32'. If, in this condition, the sliding friction between the transmission input shaft 12 and the clutch hub 16 splined thereto is of a considerable degree because of the abrasion of the input shaft and/or clutch hub as caused by shocks and vibrations exerted thereto after prolonged use of the clutch, the axial thrust $F_m$ acts to press the clutch disc 18 against the flywheel 14 even through the spring pressure on the pressure plate 22 has been relieved. It is, in this instance, known that displacement of the transmission input shaft 12 is limited by an allowance for movement in an axial direction of the main drive bearing 31 through which the input shaft is supported on the clutch housing, as previously pointed out. Thus, if such allowance for movement of the main drive bearing 31 is reduced, then the amount of displacement of the transmission input shaft 12 will be reduced and the pressure P, which as above defined is a product of a spring constant, of the clutch disc 18 and the amount of displacment of the input shaft 12, will also be reduced. It is, however, extremely difficult for technical reasons to have the allowance of movement in the axial direction of the main drive bearing 31 reduced to such an extent as to be operable to obviate unwanted engagement of the clutch disc with the flywheel during the uncoupled condition of the clutch.

Referring to FIG. 4. 4 showing a basic operational principle of the clutch according to the invention, the transmission input shaft 12 is urged away from the engine crank shaft 11 by a force corresponding to the preset load F on the compression spring 34, whereby the movement of the transmission input shaft 12 toward the crankshaft 11 is restricted and accordingly the pressure P otherwise applied to the flywheel 14 from the clutch disc 18 is alleviated to the pressure Q. When, in more detail, the clutch pedal is depressed and the transmission input shaft 12 is disconnected from the crankshaft 11, the transmission input shaft is subject to the synchronizing torque $T_m$ and, at the same time, to the axial thrust $F_m$ resulting from the helix angle of the main drive gear 32, as previously mentioned. If, in the prior art friction clutches, the main drive bearing 31 is afforded with the considerably large allowance for movement in the axial direction and if the sliding friction between the transmission input shaft 12 and the clutch hub 16 is increased to a considerable extent, then the axial thrust $F_m$ to be imparted to the transmission input shaft 12 becomes equal to the pressure P with which the flywheel 14 is pressed upon by the clutch disc 18, hence $P = F_m$. Because, however, the axial thrust $F_m$ is at least partially cancelled by the preset load F of the compression spring 34 in the clutch according to the invention, the pressure Q as exercised in the clutch shown in FIG. 4 is considerably smaller than the pressure P exercised in the clutch shown in FIG. 3, hence Q<P. If, in this instance, the clutch disc 18 possesses a spring constant $k$ in the clutch incorporating the compression spring 34, then the pressure sure Q equals $k \delta'$ where $\delta'$ is an amount of warpage of the clutch disc 18 or, from another point of view, the amount of displacement of the transmission input shaft 12.

If, furthermore, the compression spring 34 to be initially loaded with the prestress F is endowed with a spring constant $k'$, then the transmission input shaft 12 will be balanced in the axial direction provided a condition represented by the following equation holes: cl $F_m - F - K' \delta' = k \delta'$ Hence $$\delta' = (F_m - F)/(k + k')$$

This means that the pressure Q can be significantly reduced through proper selection of the values F and $k$ in the clutch according to the invention.

Figure 5:
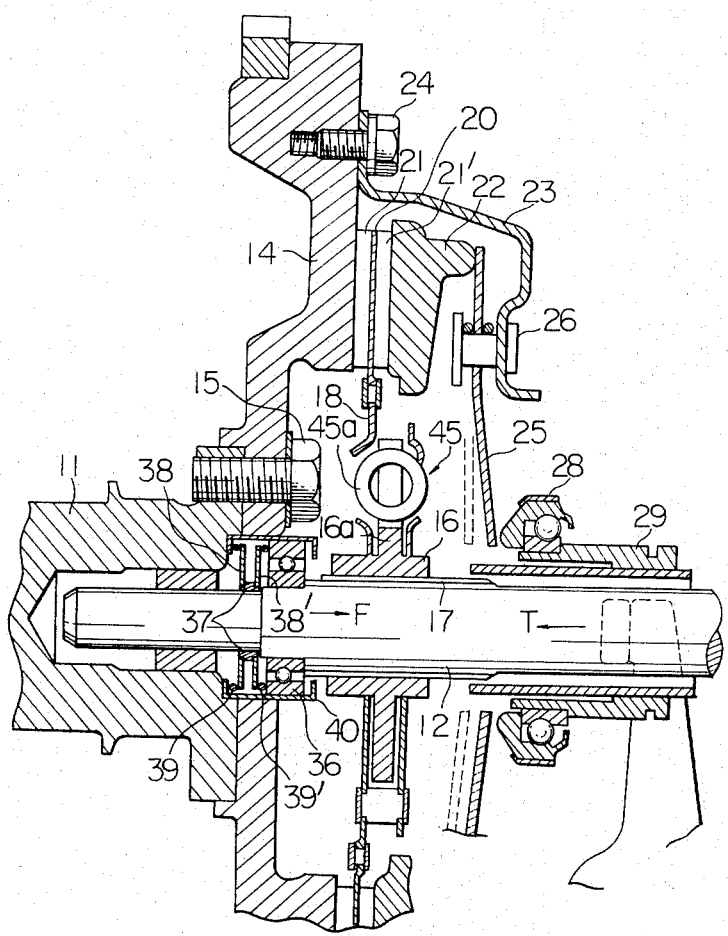
FIG. 5 is a longitudinal sectional view of another preferred embodiment of the device according to this invention.

FIG. 5 illustrates another preferred embodiment of the friction clutch implementing this invention having the above discussed outstanding features. The spring means incorporated in the clutch now includes, as clearly seen in FIG. 6 on an enlarged scale, a thrust ball bearing 36 fitting on a reduced or stepped portion 12c of the transmission input shaft 12 adjacent the engine flywheel. A thrust washer 37 is positioned around the pilot end portion 12a of the transmission input shaft 12 and between the engine crankshaft 11 and the thrust ball bearing 36. Coned disc springs 38 and 38' are positioned in face-to-face relationship to each other at both ends of the thrust washer 37. The coned disc springs 38 and 38' thus axially presses the thrust ball bearing 36 against the transmission input shaft 12 away from the engine crankshaft 11, viz., toward the transmission assembly. These coned disc springs 38 and 38' are seated on suitable insert elements such as pivot rings 39 and 39', respectively, in the manner illustrated. The thrust ball bearing 36, thrust washer 37, disc springs 38 and 38' and pivot rings 39 and 39' are all encased within a generally cylindrical retainer 40, the thrust ball bearing 36 thus being axially movably held in osition relative to the transmission input shaft 12.

Figure 7A:
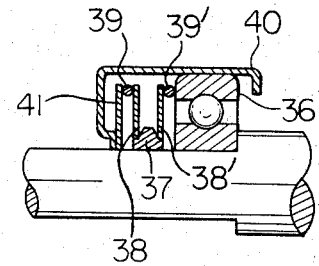
FIGS. 7A to 7E are sectional views showing essential parts of modifications of the device shown in FIGS. 5 and 6.

The thrust washer 37 and pivot rings 39 and 39' are intended to add to the amount of displacement or deformation of the coned disc springs 38 and 38' thus enabling compensation for dimensional errors, if any, in the engine crankshaft 11 and/or transmission input shaft 12 and, at the same 56 time, assuring proper application of the spring pressure to the transmission input shaft 12 from the coned disc springs 38 and 38'. Where, in this instance, considerable dimensional erros are to be involved in the crankshaft 11 and/or transmission input 12 or where a relatively ample space is available for the accommodation of the spring means, three or four or even more coned disc springs may be incorporated, if desired. FIG. 7A indicates an example in which three disc springs are used in series which include disc springs 38 and 38' fitting on the thrust washer 37 and a third disc spring 41 fitting directly on the pilot end portion 12a of the transmission input shaft 12. This third disc spring 41 is shown as seated on the pivot ring 39 on which the disc spring 38 is also seated. FIG. 7B shows another example in which a fourth coned disc spring 41' is used in addition to the disc springs 38, 38' and 41. The disc springs 41 and 41' are supported on a second thrust washer 37' which is located alongside the thrust washer 37 as shown.

Figure 6:
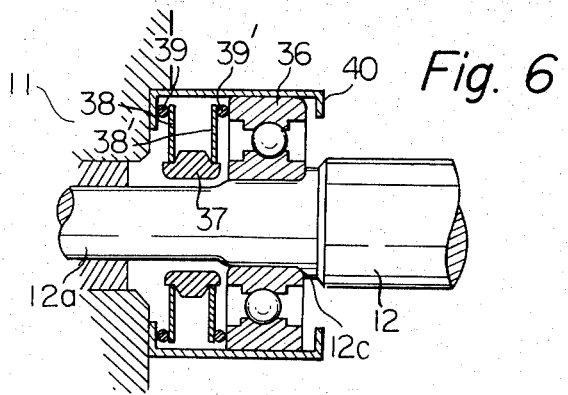
FIG. 6 is a fragmentary sectional view illustrating, on an enlarged scale, essential parts of the device shown in FIG. 5.
Figure 7C:
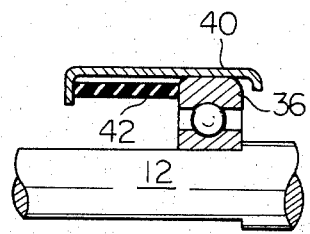
Figure 7B:
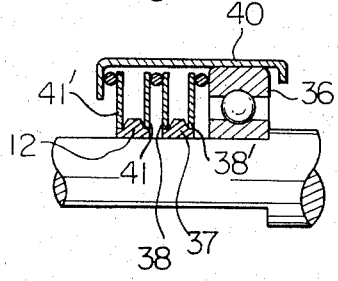
Figure 7D:
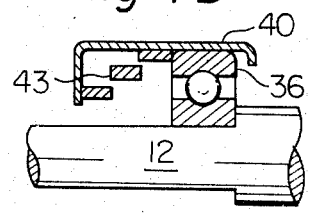
Figure 7E:
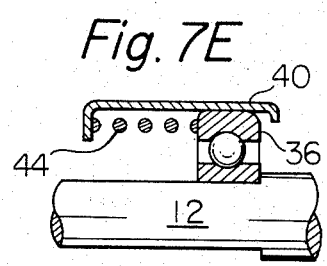

Or, the spring means for use in the embodiment shown in FIGS. 5 and 6 may be constructed as any other resilient element or elements as illustrated in FIG. 7C, 7D or 7E, in which a rubber ring 42 coned helical spring 43 or a coil spring 44, respectively, is seated at one end on the thrust bearings 36 and at the other end on a radial wall of the retainer 40 as shown. If desired, the rubber ring 42, coned helical spring 43 or coil spring 44 may be seated directly on the pilot end portion 12a of the transmission input shaft 12, though not shown.

The sizes and numbers of the coned disc springs and the associated insert element such as the pivot rings as above mentioned may be so selected as to provide a spring pressure overcoming the axial thrust to be imparted to the transmission input shaft during uncoupled condition of the clutch. The axial displacement of the transmission input shaft toward the engine crankshaft can thus be obviated or at least minimized reliably so that the problem of the retarded or incomplete disengagement of the clutch disc from the flywheel can be solved satisfactorily. Apart from this particular advantage, the embodiments shown in FIG. 5 et seq. have additional features in that the use of the thrust ball bearing in association with the transmission input shaft contributes to prolongation of the life of the spring means as a whole and in that the spring means can be readily lubricated because it is located between the crank shaft and clutch hub.

Designated by reference numeral 45 is a vibration dampener which includes a coil spring 45a received within the radial extension 16a of the clutch hub 16 and disposed in openings in the clutch disc mounts 19 and 19'. Reference numeral 43 indicates in phantom the withdrawal lever associated with the clutch release bearing 28, as previously mentioned with reference to the device shown in FIG. 1.

It should now be borne in mine that the embodiments herein described are solely for illustrative purpose and that such can be changed and modified in various manners. It should also be borned in mind that, although the embodiments have been described and shown as being of the single-disc type, the features of the clutch herein disclosed are also applicable to multiple-disc clutches.

What is claimed is:

1. In combination; a rotary driven motive output shaft; a power transmission having a movable input shaft movable in directions toward and away from said output shaft; a friction clutch for coupling and uncoupling said input shaft to said output shaft; connecting means connecting said friction clutch to said input shaft for movement along said input shaft between a clutched position wherein said friction clutch couples said input shaft and said output shaft and a declutched position wherein it uncouples said input shaft and said output shaft and for effecting rotation of said input shaft when said friction clutch couples said input shaft and said output shaft; means in said transmission applying during operation of said transmission an axial thrust force to said input shaft in a direction toward said output shaft thereby effecting movement of said input shaft towards said output shaft; and movement of said friction clutch toward said clutch position; and biasing means biasing said input shaft in a direction away from said ouput shaft for effecting movement of said input shaft away from said output shaft and movement of said friction clutch toward said declutched position thereby preventing coupling of said input shaft and said output shaft by said axial thrust force when said friction clutch uncouples said input shaft and said output shaft.

2. A combination according to claim 1: wherein said biasing means comprises a spring disposed between said output shaft and said input shaft.

3. A combination according to claim 1: including means defining a blind bore in said output shaft housing therein a portion of said input shaft; and wherein said biasing means comprises a spring disposed within said blind bore between the blind end of said blind bore and said input shaft.

4. A combination according to claim 1: wherein said biasing means comprises a thrust bearing disposed around a portion of said input shaft, spring means biasing said thrust bearing away from said output shaft, and retaining means encasing said thrust bearing and said spring means and axially movably retaining said thrust bearing and said spring means on said input shaft.

5. A combination according to claim 4: wherein said spring means comprises coned disc springs.

6. A combination according to claim 4: including seating-spacing means for seating and spacing said coned disc springs.

7. A combination according to claim 6: wherein said spring means comprises a rubber ring.

8. A combination according to claim 4: wherein said spring means comprises a coned helical spring.

9. A combination according to claim 4: wherein said spring means comprises a coil spring.

10. A combination according to claim 4; wherein said spring means comprises means disposed between said thrust bearing and said output shaft.

* * * * *